US009650042B2

(12) United States Patent
Sujan et al.

(10) Patent No.: US 9,650,042 B2
(45) Date of Patent: May 16, 2017

(54) SYSTEMS AND METHODS FOR ROUTE PLANNING

(71) Applicant: Cummins Inc., Columbus, IN (US)

(72) Inventors: Vivek Anand Sujan, Columbus, IN (US); Carlos Alcides Lana, Columbus, IN (US); J. Steven Kolhouse, Columbus, IN (US); Phani Vajapeyazula, Columbus, IN (US); Thomas M. Yonushonis, Columbus, IN (US); J. Stephen Wills, Columbus, IN (US)

(73) Assignee: Cummins Inc., Columbus, IN (US)

( * ) Notice: Subject to any disclaimer, the term of this patent is extended or adjusted under 35 U.S.C. 154(b) by 134 days.

(21) Appl. No.: 14/483,475

(22) Filed: Sep. 11, 2014

(65) Prior Publication Data

US 2016/0075333 A1    Mar. 17, 2016

(51) Int. Cl.
| | |
|---|---|
| B60W 30/10 | (2006.01) |
| G01C 21/34 | (2006.01) |
| G05D 1/02 | (2006.01) |
| G07C 5/08 | (2006.01) |
| B60W 10/30 | (2006.01) |
| B60W 10/02 | (2006.01) |
| B60W 10/18 | (2012.01) |
| B60W 10/04 | (2006.01) |
| B60W 40/13 | (2012.01) |
| B60W 40/02 | (2006.01) |

(52) U.S. Cl.
CPC ............ *B60W 30/10* (2013.01); *B60W 10/02* (2013.01); *B60W 10/04* (2013.01); *B60W 10/18* (2013.01); *B60W 10/30* (2013.01); *B60W 40/02* (2013.01); *B60W 40/13* (2013.01); *G01C 21/3469* (2013.01); *G05D 1/0217* (2013.01); *G07C 5/085* (2013.01); *G05D 2201/0213* (2013.01)

(58) Field of Classification Search
CPC ... B60W 30/10; B60W 10/30; G01C 21/3469; G05D 1/0217; G07C 5/085
USPC ............ 701/31.4, 25, 19, 123, 117; 340/934
See application file for complete search history.

(56) References Cited

U.S. PATENT DOCUMENTS

| | | | |
|---|---|---|---|
| 6,427,114 B1 * | 7/2002 | Olsson .................... | H04L 47/10 340/934 |
| 7,778,773 B2 | 8/2010 | Yaqub et al. | |
| 7,899,584 B2 | 3/2011 | Schricker | |
| 7,945,364 B2 | 5/2011 | Schricker et al. | |
| 8,290,701 B2 | 10/2012 | Mason et al. | |
| 8,332,342 B1 * | 12/2012 | Saha .................. | G01R 31/3651 706/45 |
| 9,156,477 B2 * | 10/2015 | Cooper .................. | B61L 3/006 |
| 9,239,995 B2 * | 1/2016 | Oshiro ................ | G06Q 10/047 |
| 2007/0260367 A1 * | 11/2007 | Wills .................. | B61L 27/0027 701/19 |

(Continued)

Primary Examiner — Thomas G Black
Assistant Examiner — Wae Louie
(74) Attorney, Agent, or Firm — Taft Stettinius & Hollister LLP

(57) ABSTRACT

Systems and methods are disclosed for determining a recommended route reference for a vehicle based on simulations of a model of the vehicle including load information, route information, and a cost strategy, and providing commands to an output device based on the recommended route reference to provide an operator of the vehicle with feedback on the recommended route reference and/or to control the vehicle.

46 Claims, 3 Drawing Sheets

(56) References Cited

U.S. PATENT DOCUMENTS

| | | |
|---|---|---|
| 2007/0260372 A1* | 11/2007 | Langer .................. G01M 17/04 |
| | | 701/31.4 |
| 2007/0260373 A1* | 11/2007 | Langer ................ G01M 17/007 |
| | | 701/31.4 |
| 2007/0260438 A1* | 11/2007 | Langer ................ G01M 17/007 |
| | | 703/8 |
| 2011/0184642 A1* | 7/2011 | Rotz .................. G01C 21/3492 |
| | | 701/533 |
| 2012/0173075 A1 | 7/2012 | Mays |
| 2012/0197504 A1 | 8/2012 | Sujan et al. |
| 2012/0239588 A1 | 9/2012 | Sujan et al. |
| 2014/0094998 A1* | 4/2014 | Cooper .................... B61L 3/006 |
| | | 701/2 |
| 2015/0232097 A1* | 8/2015 | Luther .................... B61L 3/006 |
| | | 701/123 |
| 2016/0075333 A1* | 3/2016 | Sujan .................... B60W 30/10 |
| | | 701/25 |

\* cited by examiner

SYSTEMS AND METHODS FOR ROUTE PLANNING

BACKGROUND

The present application generally relates to route planning, and in particular relates to planning a route for delivering at least a portion of a cargo load to delivery locations. After a vehicle and a cargo load (i.e., goods) have been selected for delivery and delivery locations identified, there are typically numerous possibilities for available route options between the starting location, one or more delivery locations, and the end location. Therefore, a need remains for further improvements in systems and methods in this area.

SUMMARY

One embodiment is a unique system and method for determining a recommended route reference based on simulations of a model of a vehicle. Other embodiments include apparatuses, systems, devices, hardware, methods, and combinations thereof for determining a recommended route reference and providing an operator of the vehicle with the recommended route reference and/or controlling the vehicle based on the recommended route reference. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

Figure 1:
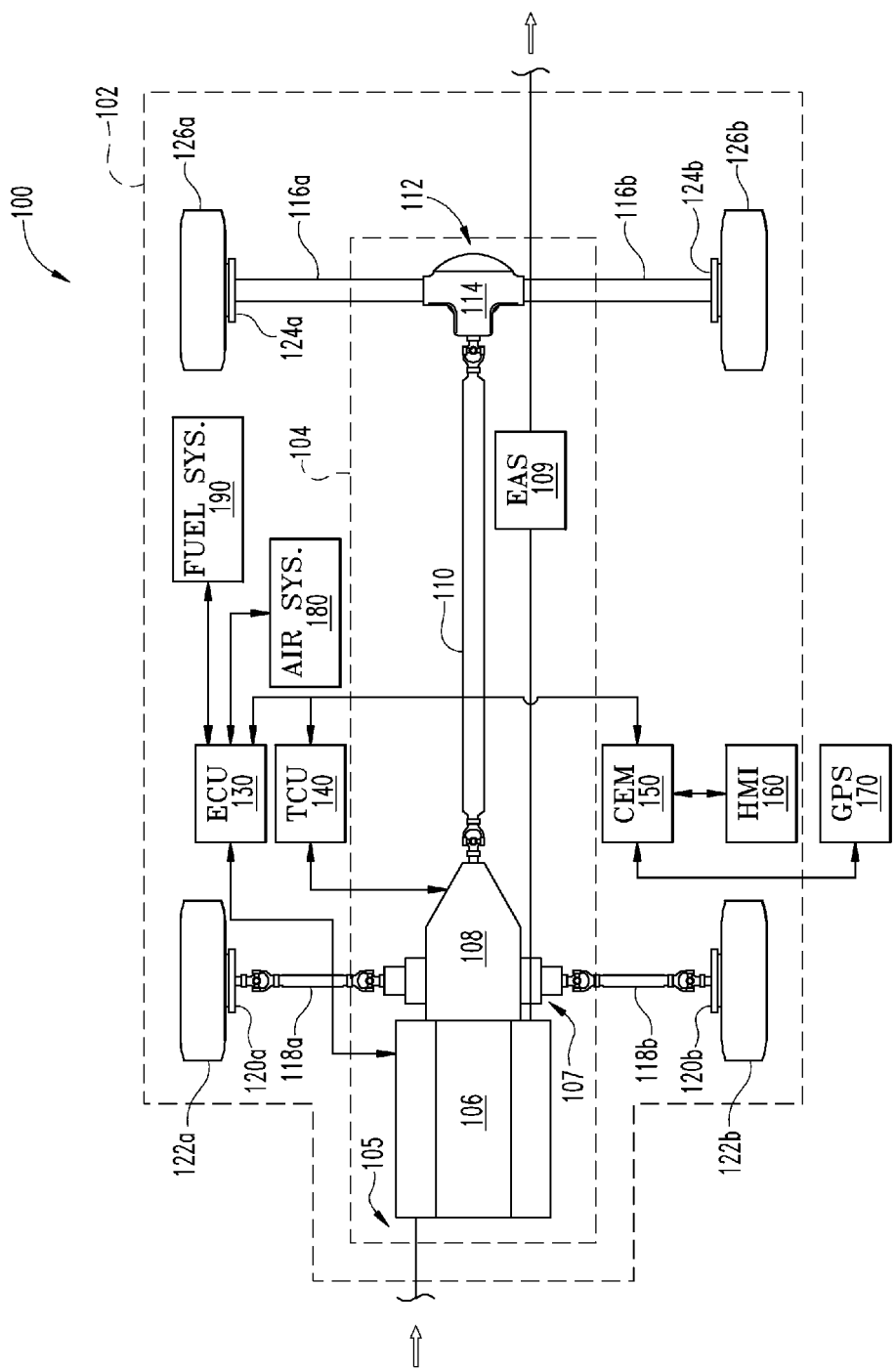
FIG. 1 is a block diagram of an example vehicle system including a powertrain and a cycle efficiency management (CEM) controller.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated an example system 100 that includes a vehicle 102 with a powertrain 104 including an engine 106, such as an internal combustion engine, for generating power for the system 100. The engine 106 may be any type of internal combustion engine known in the art. In some applications, the internal combustion engine 106 may be a diesel engine, although gasoline engines and engines that operate with any type of fuel are contemplated herein. The engine 106 is in fluid communication with an engine intake system 105 through which charge air enters the engine 106, and an engine exhaust system 107 through which exhaust gas resulting from combustion in the engine 106 may exit the engine 106, it being understood that not all details of these systems that are typically present are shown. The exhaust gas passes through an exhaust aftertreatment system 109 fluidly coupled to the engine exhaust system 107. In certain embodiments, the exhaust aftertreatment system 109 promotes a chemical reaction between a reductant and a $NO_x$ constituent in the exhaust gas that reduces an amount of the $NO_x$ during nominal operation, at least partially converting $NO_x$ to $N_2$ to reduce the emissions of the engine 106.

The powertrain 104 further includes a transmission 108 operably connected to the engine 106 for adapting the output torque of the engine 106 and transmitting the output torque to a drive shaft 110. It is contemplated that in certain embodiments that additional coupling components, such as an output shaft, a gear box, and a clutch (not shown) may be included in powertrain 104. Other suitable coupling arrangements capable of providing drive torque to the drivetrain are contemplated herein.

The vehicle 102 illustrated in FIG. 1 includes a rear wheel drive configuration including a final drive 112 having a rear differential 114 connecting the drive shaft 110 to rear axles 116a and 116b. It is contemplated that the components of the vehicle 102 may be positioned in different locations throughout the vehicle 102. In one non-limiting example, in a vehicle having a front wheel drive configuration, the transmission 108 may be a transaxle and the final drive 112 may reside at the front of the vehicle 102 to connect front axles to the engine 106 via the transaxle.

The vehicle 102 further includes two rear brakes 124a and 124b, each positioned between two rear wheels 126a and 126b and rear axles 116a and 116b, respectively. The vehicle 102 additionally includes two front brakes 120a and 120b, each positioned between and operably connected to two front wheels 122a and 122b and front axles 118a and 118b, respectively. It is contemplated that in certain embodiments the vehicle 102 may have more or fewer tires and/or brakes than illustrated in FIG. 1.

The vehicle 102 additionally includes an air handling system 180 and a fuel management system 190. In certain embodiments, the air handling system 180 may include the engine intake system 105, the engine exhaust system 107, an exhaust gas recirculation system (EGR), a turbocharger, and/or various actuators for controlling intake air and/or exhaust gas throughout the vehicle 102. In certain embodiments, the fuel management system 190 may include a fuel tank, fuel injectors, and the like for storing, monitoring, and distributing fuel throughout the vehicle 102.

The vehicle 102 includes an electronic or engine control unit (ECU) 130, sometimes referred to as an electronic or engine control module (ECM), or the like, which is directed to regulating and controlling the operation of engine 106. A transmission control unit (TCU) 140 is illustrated in the vehicle 102, which is directed to the regulation and control of transmission 108 operation. The ECU 130 and the TCU 140 are each in electrical communication with a plurality of vehicle sensors (not shown) in the vehicle 102 for receiving and transmitting conditions of the vehicle 102, such as temperature and pressure conditions, for example. In certain embodiments, the ECU 130 and the TCU 140 may be combined into a single control module, commonly referred to as a powertrain control module (PCM) or powertrain control unit (PCU), or the like. It is contemplated that the ECU 130 may be integrated within the engine 106 and/or the TCU 140 may be integrated within the transmission 108. Other various electronic control units for vehicle subsystems are typically present in the vehicle 102, such as a braking system electronic control unit and a cruise control electronic control unit, for example, but such other various electronic control units for vehicle subsystems are not show in system 100 to preserve clarity.

The vehicle 102 further includes a cycle efficiency management (CEM) controller 150 that employs control processes to provide an operator of the vehicle 102 with a recommended route reference via an operator feedback device and/or to control the speed of the vehicle 102 based on the recommended route reference to optimize vehicle routing. The CEM controller 150 may be electrically coupled to the ECU 130 for receiving sensor data and conditions of the vehicle 102. The CEM controller 150, which may be dedicated to the control of just the operations described herein, is described in further detail in FIGS. 2-3, and/or directed toward an intermediary control for the regulation and control of the engine 106 in system 100.

In the illustrated embodiment, the CEM controller 150 is in electrical communication with the ECU 130 and the TCU 140. It is contemplated that in certain embodiments the CEM controller 150 may be in electrical communication with either the ECU 130 or the TCU 140. In certain embodiments, at least a portion of the CEM controller 150 may be integrated within the ECU 130 and/or the TCU 140. The CEM controller 150 may further be in electrical communication with one or more of the plurality of vehicle sensors in the vehicle 102 for receiving and transmitting conditions of the vehicle 102, such as temperature and pressure conditions, for example.

It is contemplated that at least a portion of the conditions and/or measured inputs required for interpreting signals by the CEM controller 150 may be received from the ECU 130 and/or the TCU 140, in addition to or alternatively to the plurality of vehicle sensors. It is further contemplated that in certain embodiments the ECU 130, the TCU 140, and/or the CEM controller 150 may transmit data communication messages across a controller area network (CAN) bus. The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. It is contemplated that in certain embodiments an alternative vehicle bus protocol may be used, such as a vehicle area network (VAN) or one of the Society of Automotive Engineers (SAE) vehicle bus protocols, for example.

In certain embodiments, any or all of the ECU 130, the TCU 140, and the CEM controller 150 may be electronically communicatively coupled to a human-machine interface (HMI) 160, also commonly referred to as a man-machine interface (MMI), a human-computer interaction (HCI), an operator interface console (OIC) or terminal (OIT), or the like. The HMI 160 provides an interface for a human-machine interaction between an operator and one or more input, output, or combination peripheral interface devices (not shown). Example input peripheral interface devices include a sensor, a button, a microphone, a keyboard, a track pad, and a mouse. Examples of output peripheral interface devices include sensory devices such as a display monitor, an indicator light, a gauge, a printer, and a speaker. An example of a combination peripheral interface device includes a display monitor with touchscreen capability.

In certain embodiments, the HMI 160 may be structured to receive and interpret signals from each of the ECU 130, the TCU 140, and the CEM module 150 and display them to the operator on the one or more output peripheral interface devices, generally via a graphical user interface (GUI), which provides graphical representations of the interpreted signals in a user readable form. In certain embodiments, the one or more input peripheral interface devices receive operator generated commands and transmit the commands to the HMI 160, where the HMI interprets the commands and relays signals to the ECU 130, the TCU 140, and/or the CEM controller 150. Other means of representing the interpreted signals to the operator in addition to or alternatively to the GUI are contemplated, including via one or more sensory indicators, such as indicator lights, tactile feedback, and/or audible sounds, for example.

In certain other embodiments, in addition to or as an alternative to the HMI 160, a machine-machine feedback interface may be included in the vehicle 102. For example, in a driverless (i.e., autonomous) vehicle application, a machine-machine feedback interface may be structured to receive and interpret signals from the ECU 130, the TCU, 140, and/or the CEM module 150 and provide feedback to and in a format readable by one or more control units operable to make decisions for the vehicle 102 based on the input signals that might otherwise be performed by the operator of the vehicle 102.

In the example embodiment illustrated in FIG. 1, a navigation and positioning system 170, such as a global position system (GPS) device, may be mounted external to the vehicle 102. Additionally or alternatively, an electronic horizon device may be connected to the vehicle 102. In certain embodiments, the navigation and positioning system 170 may be in electrical communication with the CEM controller 150 to provide route information to the CEM controller 150. In certain embodiments, additional information from the navigation and positioning system 170 may be transmitted to the CEM controller 150, such as traffic, elevation, and/or weather conditions, for example. It is contemplated that in certain embodiments, specifically where a navigation and positioning system 170 is not connected to the CEM controller 150, that route information may be programmed into memory and accessed by the CEM controller 150 at any portion along a route.

The CEM controller 150 includes stored data values, constants, and functions, as well as operating instructions stored on a non-transient computer readable medium. Any of the operations of example procedures described herein may be performed at least partially by the CEM controller 150. In certain embodiments, the CEM controller 150 includes one or more modules structured to functionally execute the operations of the CEM controller 150. The description herein including modules emphasizes the structural independence of the aspects of the CEM controller 150, and illustrates one grouping of operations and responsibilities of the CEM controller 150. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. More specific descriptions of certain embodiments of the CEM controller 150 operations are included in the section referencing FIGS. 2-3. Operations illustrated are understood to be exemplary only, and operations may be combined or divided, and added or removed, as well as re-ordered in whole or in part.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The CEM controller 150 is structured to provide one or more route reference recommendations (e.g., a route plan, a vehicle speed, a vehicle gear, etc.) based on various vehicle conditions, cargo load and delivery conditions, costs associated with delivering the cargo load, and/or the like. In certain embodiments, the CEM controller 150 may be further structured to alter the route reference recommendations based on real-time data received by the CEM controller 150. The route reference recommendations may be based on a position of the vehicle as a function of time and an engine load, gear, cargo drop-off sequence, and/or vehicle speed as functions of time and/or distance. In certain embodiments, the CEM controller 150 may be additionally structured to operate in an offline mode, providing an initial set of route reference recommendations.

The CEM controller 150 is structured to receive and interpret signals (i.e., inputs) from various sensors positioned throughout the vehicle 102 indicating conditions of at least a portion of the vehicle 102. The CEM controller is further structured to receive and interpret signals from the ECU 130, the TCU 140, the HMI 160, and/or the navigation and positioning system 170.

Figure 2:
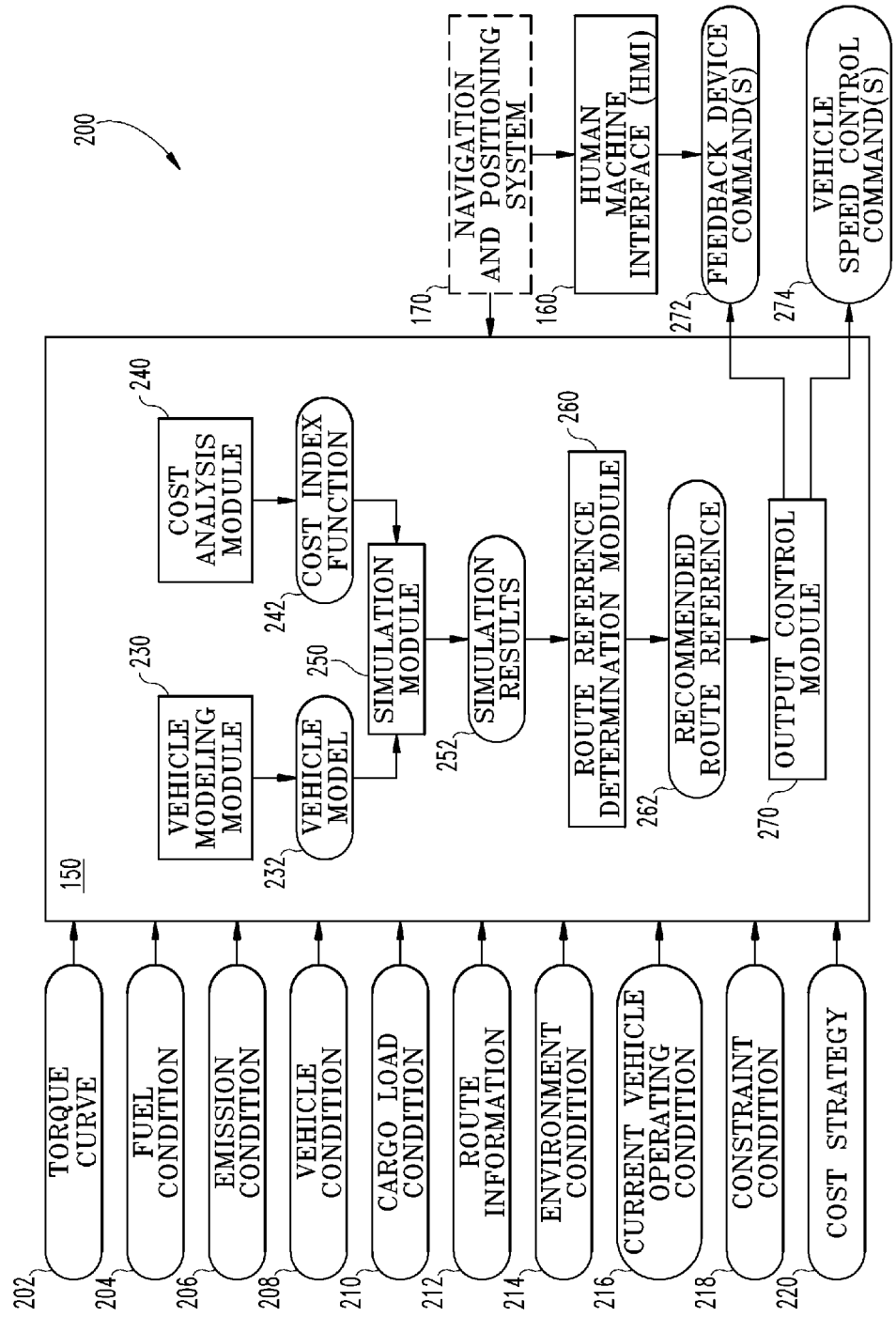
FIG. 2 is a block diagram of an example cycle efficiency management (CEM) controller shown in FIG. 1.

With reference to FIG. 2, there is illustrated an embodiment 200 of the CEM controller 150 for determining a route reference recommendation are provided. The embodiment 200 includes a vehicle modeling module 230, a cost analysis module 240, a simulation module 250, a route reference determination module 260, and a route execution module 270. Other arrangements that functionally execute the operations of the CEM controller 150 are contemplated in the present application.

In certain embodiments, the inputs may include a torque curve input 202, a fuel condition input 204, an emission condition input 206, a vehicle condition input 208, a cargo load condition input 210, a route information input 212, an environment condition input 214, a current vehicle operating condition input 216, a constraint condition input 218, and a cost strategy input 220.

It is contemplated that in certain embodiments, as an alternative to receiving the torque curve input 202, the CEM controller 150 may be further structured to determine a torque curve based on current, additional, and/or alternative inputs to the CEM controller 150 and/or various look-up tables stored within or accessible by the CEM controller 150. It is further contemplated that in certain embodiments, the cargo load condition input 210, the route information input 212, the constraint condition input 218, and the cost strategy input 220 may be input by an operator (e.g., entered through the HMI 160) to a memory accessible and readable by the CEM controller 150 and/or passed as an interpretable signal to the CEM controller 150 upon request.

The fuel condition input 204 may include a fuel amount, a fuel cost, a fuel tank capacity, a number of fueling stops, and/or a distance between each of the fueling stops. The fuel cost may be the current fuel cost in a monetary unit cost per gallon or an average fuel cost along an available route. In certain embodiments, the fuel condition input 204 may further include the availability of a fuel source and/or a fuel source station, such as electric recharging stations, natural gas refueling stations, hydrogen refueling stations, and/or any other fuel source refilling known in the art.

The emission condition input 206 may include an emission output, an emission performance level, and/or a regeneration frequency of one or more components of the exhaust aftertreatment system of the vehicle 102. In certain embodiments, the emission condition input 206 may include a regeneration cost implication, such as the cost of operating the vehicle 102 under extended low engine load periods. The vehicle condition input 208 may include a rolling resistance, an air resistance, a powertrain gearing, a powertrain friction, a powertrain wear value, a maximum torque output, a temperature reading, a pressure amount, an air-to-fuel ratio, and/or an actuator position.

The cargo load condition input 210 may include a load weight, a load pickup time, a load pickup location, a load drop-off time, a load drop-off location, a temperature setting, a hazardous material cost, an insurance cost, and/or a permitting cost for a plurality of loads. In certain embodiments, the cargo load condition input 210 may include loads transitioned between vehicles, which may include different types of vehicles, and may additionally include portions of the route where the vehicle 102 is empty. The route information input 212 may include a route surface grade, a route surface type, a maximum speed limit, a minimum speed limit, a maximum route trip time, a traffic condition, and/or an elevation.

In certain embodiments, the route information input 212 may be received by the CEM controller 150 from the navigation and positioning system 170, such as a global positioning system (GPS) device and/or a manual route information entry device, for example. In certain embodiments, the manual route information entry device may include the HMI 160. The environment condition input 214 may include a wind amount, a precipitation amount, a precipitation type, and/or a relative humidity.

The current vehicle operating condition input 216 may include a current wheel speed, a current fuel amount, a current actuator position, a current torque output, a current air-to-fuel ratio, a current engine condition, and/or a current longitudinal velocity of the vehicle 102. The constraint condition input 218 may include a start time, an end time, a maximum travel duration, a maximum number of fuel stops, a minimum fuel amount, a minimum number of rest periods, a maximum number of rest periods, a minimum rest duration and/or a maximum rest duration for each of the rest periods.

The cost strategy input 220 may be a cost control strategy input by the operator that may be based on the fuel cost, a total trip cost, an emission output cost, a vehicle wear cost, a consumer cost, a ton-mile cost, a vehicle maintenance cost, and/or a cargo cost. The cost strategy input 220 may include a cost strategy to minimize any of the costs associated with the cost control strategy (i.e., a cost minimization strategy). In certain embodiments, the cost minimization strategy may include a fuel economy strategy, a total cost of ownership minimization strategy, and/or a system wear minimization strategy. In certain embodiments, the cost strategy input 220 may additionally or alternatively include an income maximization strategy, such as during an incentive based delivery route, for example. It is contemplated that in certain embodiments a combination of cost control strategies may be included in the cost strategy input 220.

The vehicle modeling module 230 may be structured to receive and interpret any of the CEM controller 150 inputs to determine a vehicle model 232. In certain embodiments, the vehicle model 232 may be based on components internal to the vehicle 102, such as the powertrain 104, and/or elements external to the vehicle, such as the environment condition input 214. The cost analysis module 240 may be structured to receive and interpret the cost strategy input 220 to determine a cost index function.

The simulation module 250 may be structured to receive and interpret the vehicle model 232 from the vehicle modeling module 230 and the cost index function 242 from the cost analysis module 240. The simulation module 250 may be further structured to perform one or more simulations for each available route from the route information input 212 based on the vehicle model 232 and/or the cost index function 242. In certain embodiments, the results of the one or more simulations may include a cost index function for each of the simulations. It is contemplated that the vehicle model 232 may be updated at any point during the route. It is further contemplated that the vehicle model 232 updated during the route may be a limited form of the model, such as a vehicle model relative only to certain actuators or parameters and/or a vehicle model only responsive to significant disturbance or deviation from the current route. In certain other embodiments, the vehicle model 232 may be constrained to only update under certain conditions.

The route reference determination module 260 may be structured to receive and interpret the simulation results 252 to determine a recommended route reference 262. In certain embodiments, the recommended route reference 262 is determined by the route reference determination module based on the cost index function. In certain embodiments, route reference determination module 260 may be further structured the receive route information from the navigation and positioning system 170.

It is contemplated that only a portion of the route information input 212 may be used to determine the recommended route reference under certain conditions, such as response time sensitive conditions and/or computing resource limited conditions, for example. Under such conditions, a priority of application of the cost index function 242 to each portion of the route information input 212 may be used.

In certain embodiments, the route reference determination module 260 may be further structured to compare the recommended route reference 262 to a default route. The default route may be compared against alternative routes for identifying high cost incidents (e.g., a steep hill, an expensive to maintain cargo, a permit to carry cargo along certain portions of the route, etc.) and prioritizing the identified areas for improvement first. In certain embodiments, a sensitivity analysis may be used to limit certain deviations between available routes and/or between alternative routes and the default route for determining the recommended route reference 262. In certain embodiments, the recommended route reference 262 may include an overall maximum or minimum constraint (e.g., trip distance, fuel usage, etc.) and/or a local maximum or minimum constraint (e.g., distance between delivery drop-off locations, rest duration, etc.).

The output control module 270 may be structured to receive and interpret the recommended route reference 262 from the route reference determination module 260. The output control module 270 may be further structured to determine one or more commands to one or more output devices. In certain embodiments, the output devices may include a memory device, a sensory feedback device, and/or a vehicle speed control device. The commands may include a feedback device command 272 and/or a vehicle speed control command 274 based on the recommended route reference 262.

The feedback device command 272 may be provided to an output notification device structured to receive and interpret the feedback device command 272 and to provide sensory feedback to the operator of the vehicle 102. The output notification device may include the human machine interface 160, an on-board diagnostic (OBD) connected device (e.g., a human readable interface connected via an OBD serial port), an indicator lamp, a gauge, a printer, a memory device, a speaker, and/or any display device capable of displaying the route reference corresponding to the feedback device command 272 to the operator. In certain embodiments, the output notification device may additionally or alternatively include a memory device for storing a log of the vehicle models 232, cost index functions 242, simulation results 252, and/or recommended route references 262 during a trip, for example. In other embodiments, the recommended route reference 262 may not be physically realizable, and the feedback device command 272 may include a suggestion to change and/or recalibrate certain components of the vehicle 102, such as the engine 106, for example.

The vehicle speed control commands 274 may be provided to a vehicle speed control device structured to receive and interpret the feedback device command 272 and to control the speed of the vehicle 102. In certain embodiments, the vehicle speed control commands 274 may include setting a cruise speed limit and/or performing an automated vehicle control, such as providing the vehicle speed control commands 274 to the TCU 140 or directly to the transmission 108 to shift at certain points, and/or setting engine torque and/or speed limits. In certain embodiments, the vehicle speed control commands 274 may include a command to set a brake actuator position, a throttle actuator position, a fuel injector, an engine torque, a transmission gear ratio, and/or a final drive selection.

Figure 3:
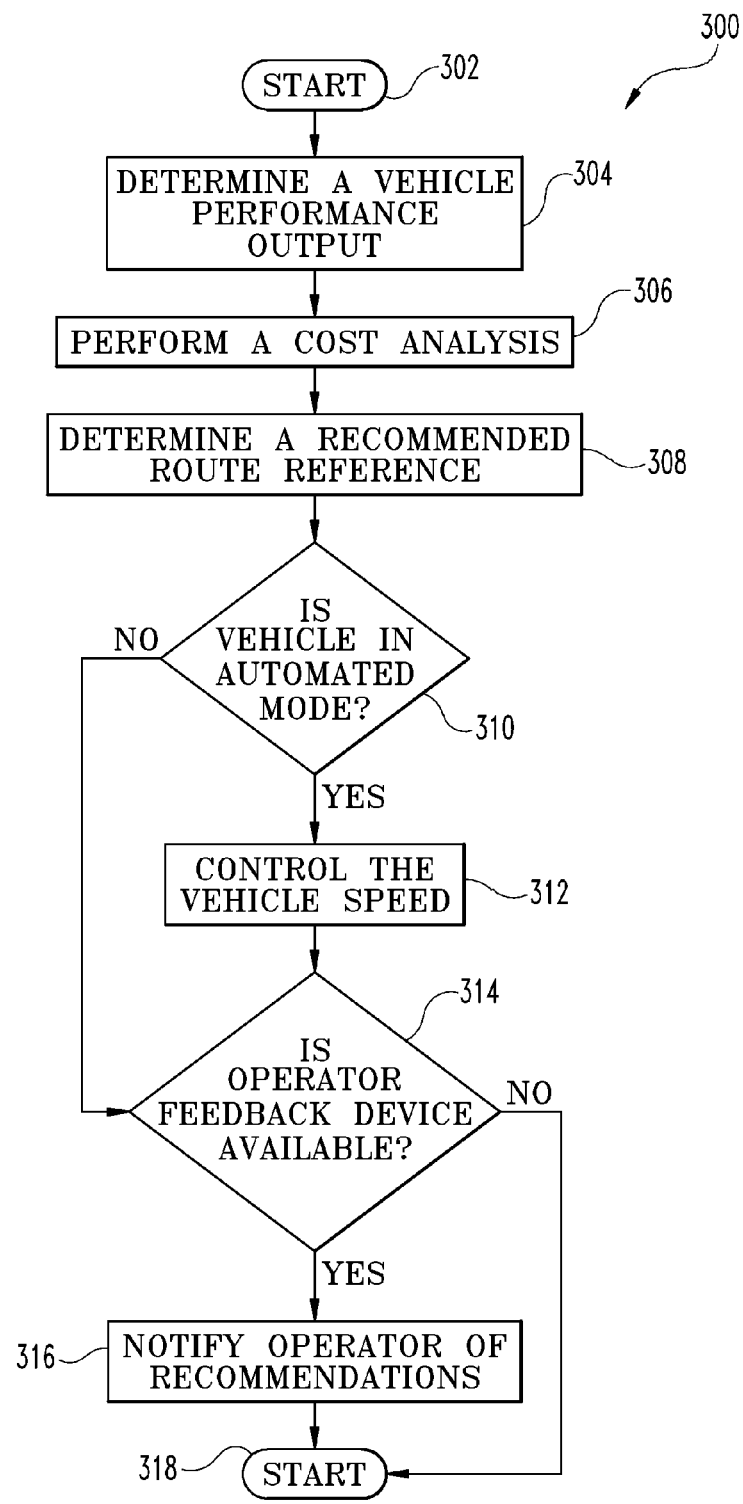
FIG. 3 is a flow diagram of an example procedure for determining a recommended route reference using the cycle efficiency management (CEM) controller shown in FIG. 2.

The schematic flow diagram illustrated in FIG. 3 and related description which follows provides an illustrative embodiment of performing example procedures for providing one or more output device commands based on a recommended route reference. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of a procedure 300 for determining a recommended route reference and providing commands to one or more output devices. The procedure 300 may be put into operation by programming the CEM controller 150 for use in, for example, vehicle 102. The procedure 300 begins at operation 302, in which a control routine for providing various inputs to the CEM controller 150 to determine a recommended route reference is started. Operation 302 may begin by interpreting a key-on event, completion of a cycle, restarting procedure 300, and/or by initiation by the operator or a technician.

Procedure 300 continues to operation 304 to determine a model of the vehicle. The model of the vehicle include vehicle performance information, cargo load information, and vehicle system constraints. In certain embodiments, the vehicle performance information may include a torque curve, a fuel economy, an emissions performance, a vehicle wear condition, and/or the like. In certain embodiments, the cargo load information may include information about cargo loads presently on-board the vehicle 102, cargo loads awaiting pickup, cargo load drop-off information (e.g., drop-off time and location), cargo load requirements (e.g., refrigeration, hazmat, etc.), and/or cargo load costs (e.g., permitting costs). In certain embodiments, the system constraints may include times to destinations, maximum and minimum speed limits, required rest periods, etc.

From operation 304, procedure 300 continues to operation 306 to perform a cost analysis. In certain embodiments, the cost analysis may be determined based on a cost strategy input by the user, information pertaining to each of the available routes, and the vehicle model determined at operation 304. Procedure 300 continues from operation 306 to operation 308 to determine a recommended route reference. In certain embodiments the recommended route reference may include a route reference recommendation and/or a recommended vehicle speed and/or vehicle gear pertaining to a portion of a recommended route, for example.

From operation 308, procedure 300 continues to conditional 310 to determine whether the vehicle 102 is being operated in automated mode. If it is determined the vehicle 102 is being operated in automated mode, procedure 300 continues to operation 312 where a control command is sent to a vehicle speed control device of the vehicle 102. In certain embodiments, the vehicle speed control device may include a brake actuator, a throttle actuator, a fuel injector, the engine 106, the transmission 108, the final drive 112, and/or other vehicle control device capable of adjusting the speed of the vehicle. In certain embodiments the control command may include a position of the brake actuator, a position of the throttle actuator, a fuel rate of the fuel injector, a torque output of the engine 106, a gear ratio of the transmission 108, and/or a selection of the final drive 112. From operation 312, procedure 300 continues to conditional 314 discussed in further detail below.

If it is determined the vehicle 102 is not being operated in automated mode, procedure 300 continues to conditional 314 to determine whether an operator feedback device is available. The operator feedback device may include a sensory feedback device, such as a human machine interface, an on-board diagnostic connected device, an indicator lamp, a gauge, a printer, a speaker, a display device, and/or the like. If it is determined that an operator feedback device is not available, procedure 300 continues from conditional 314 to operation 318, where the current iteration of procedure 300 is ended. If it is determined that an operator feedback device is available, procedure 300 continues from conditional 314 to operation 316 to notify the operator of the vehicle the recommended route reference determined at operation 308 via the operator feedback device before procedure 300 continues to operation 318, ending the current iteration of procedure 300.

One aspect of the present application includes a method, comprising: receiving, from a plurality of input devices in a vehicle system, route information for each of a plurality of possible routes, vehicle information of the vehicle system, and cargo load information for each of one or more cargo loads and a performance target; determining, with a controller, a model of the vehicle system based on at least one of a powertrain, an air handling system, a fuel management system, and an exhaust aftertreatment system, the powertrain including an engine and a transmission; running a simulation based on the model of the vehicle system, the route information, the vehicle information, the cargo load information, and the performance target; and determining one or more route reference recommendations based on a result of the simulation.

Features of the aspect of the present application may include: wherein the result of the simulation includes at least one of a torque curve, a fuel economy, an emission performance of the exhaust aftertreatment system, and a vehicle wear; wherein providing the one or more route reference recommendations includes providing at least one of an estimated trip time, one of the plurality of possible routes, a number of stops, a fuel amount at any position along the one of the plurality of possible routes, a speed of the vehicle system, and a gear of the vehicle system; receiving, from the plurality of input devices, an environment condition, wherein running the simulation is further based on the environment condition, and wherein the environment condition includes at least one of a wind amount, a precipitation amount, a precipitation type, and a relative humidity; wherein receiving the environment condition includes receiving at least one of a wind amount, a precipitation condition, an altitude, and a relative humidity; updating the model in real-time at any position along one of the plurality of possible routes, wherein running the simulation is further based on the updated model; wherein the output device includes at least one of an on-board diagnostic connected device, an indicator lamp, a gauge, a printer, a memory device, a speaker, a display device, a brake actuator, a throttle actuator, a fuel injector, the engine, the transmission, and a final drive of the vehicle; providing the one or more route reference recommendations to an output device; performing at least one of the one or more route reference recommendations with the controller; wherein the performance target includes at least one of a cost minimization strategy, a fuel efficiency maximization strategy, a system wear minimization strategy, and an income maximization strategy.

Another aspect of the present application includes a method, comprising: interpreting, with a controller in a vehicle, one or more cargo load references and one or more performance targets from a user input device; interpreting a plurality of available routes from a mapping input device, each of the available routes including route information; generating a model of the vehicle, the vehicle including a powertrain, an intake system, an exhaust system, and an exhaust aftertreatment system, the powertrain including an engine and a transmission; simulating the model of the vehicle based on the available routes and route information, the cargo load references, and the performance targets; and determining a route reference recommendation based on a result of simulating the model, wherein generating the model of the vehicle is based on at least one of the powertrain, the intake system, the exhaust system, and the exhaust aftertreatment system.

Features of the aspect of the present application may include: wherein the cargo load references include at least one of a load weight, a load pickup time, a load pickup location, a load drop-off time, and a load drop-off location; wherein the cargo load references further include at least one of a temperature setting, a hazardous material cost, an insurance cost, and a permitting cost; further comprising interpreting a current operating condition of the vehicle, wherein simulating the model is further based on the current operating condition of the vehicle; wherein interpreting the current operating condition of the vehicle includes interpreting at least one of a wheel speed, a fuel amount, a brake position, a torque curve, an air-to-fuel ratio, an engine condition, an environment condition, and a longitudinal velocity of the vehicle; determining whether the vehicle is in automated mode; and providing a vehicle speed control command based on the route reference recommendation, when the vehicle is determined to be in automated mode, to a vehicle speed control device for controlling the vehicle; wherein controlling the vehicle includes controlling at least one of a brake actuator position, a throttle actuator position, a fuel injector, an engine torque, a transmission gear ratio, and a final drive selection; displaying the route reference recommendation on a feedback device; performing the route reference recommendation with the controller; wherein the performance targets include at least one of a cost minimization strategy, a fuel efficiency maximization strategy, a system wear minimization strategy, and an income maximization strategy.

Yet another aspect of the present application includes a system, comprising: a vehicle including a powertrain and an exhaust aftertreatment system, wherein the powertrain includes an engine and a transmission; and an electronic controller in operative communication with a plurality of inputs operable to provide signals indicating conditions of at least a portion of the vehicle, wherein the electronic controller includes: a vehicle modeling module structured to determine a model of the vehicle; a cost analysis module structured to determine a cost index function based on a cost strategy; and a route reference determination module structured to determine a recommended route reference based on the vehicle model, the cost index function, a plurality of possible routes, and at least one of a torque curve, a fuel condition, an emission condition, a vehicle wear condition, a vehicle condition, a load condition, a route condition, an environment condition, a cost, and a constraint condition.

Features of the aspect of the present application may include: wherein the fuel condition includes a fuel amount, a fuel cost, a fuel tank capacity, a number of fueling stops, and a distance between each of the fueling stops; wherein the emission condition includes at least one of an emission output, an emission performance level, and a regeneration frequency of one or more components of the aftertreatment system; wherein the vehicle condition includes at least one of a rolling resistance, an air resistance, a gearing of the powertrain, a friction of the powertrain, a wear value of the powertrain, a maximum torque output, a temperature reading, a pressure amount, an air-to-fuel ratio, and an actuator position; wherein the load condition includes at least one of a load weight, a load pickup time, a load pickup location, a load drop-off time, a load drop-off location, a temperature setting, a hazardous material cost, an insurance cost, and a permitting cost for a plurality of loads; wherein the route condition includes at least one of a route surface grade, a route surface type, a maximum speed limit, a minimum speed limit, a maximum route trip time, a traffic condition, and an elevation; wherein the environment condition includes at least one of a wind amount, a precipitation amount, a precipitation type, and a relative humidity; wherein the constraint condition includes at least one of a start time, an end time, a maximum travel duration, a maximum number of fuel stops, a minimum fuel amount, a minimum number of rest periods, a maximum number of rest periods, a minimum rest duration, and a maximum rest duration for each of the rest periods; wherein the cost strategy includes at least one of minimizing a fuel cost, minimizing a total cost, minimizing an emission output cost, minimizing a vehicle wear cost, minimizing a consumer cost, minimizing a ton-mile cost, minimizing a vehicle maintenance cost, and minimizing a cargo cost; wherein the recommended route reference is further based on at least one of one or more top speed limitations, one or more drop-off orders, one or more gear selection schemes, one or more cost incidents, and a sensitivity analysis; wherein the output control module is further structured to determine at least one of a vehicle speed command to control a speed of the vehicle and a vehicle gear command to control a gear selection of the vehicle in response to the recommended route reference and a current operating condition of the vehicle; wherein the current operating condition of the vehicle includes at least one of a current wheel speed, a current fuel amount, a current actuator position, a current torque output, a current air-to-fuel ratio, an engine condition, and a current longitudinal velocity of the vehicle; wherein the engine condition includes at least one of an ambient air pressure, an ambient air temperature, a throttle position of the engine, and a torque output of the engine; wherein the electronic controller further includes: an output control module structured to provide a route reference to an output device based on the recommended route reference; wherein the electronic controller further includes: an output control module structured to control the vehicle in accordance with the recommended route reference.

Another aspect of the present application includes a system, comprising: a vehicle including a powertrain, an air handling system, a fuel management system, and an exhaust aftertreatment system, wherein the powertrain includes an engine and a transmission; and an electronic controller in operative communication with a plurality of inputs operable to provide signals indicating conditions of at least a portion of the vehicle, wherein the electronic controller includes: a vehicle modeling module structured to determine a model of the vehicle based on at least one of the powertrain, the air handling system, the fuel management system, the exhaust aftertreatment system, and a vehicle condition; a cost analysis module structured to determine a cost index function based on the model of the vehicle and a cost strategy; a simulation module structured to run one or more simulations based on the vehicle model, the cost index function, at least one of a vehicle performance information, a load information, a constraint, and available route information of one or more available routes; and a route reference determination module structured to determine one or more route reference recommendations based on the simulations.

Features of the aspect of the present application may include: wherein the available route information includes at least one of route surface grade, a route surface type, a traffic condition, a maximum speed limit, a minimum speed limit, and an elevation; wherein the vehicle condition includes at least one of a rolling resistance, an air resistance, a powertrain gearing, a powertrain friction, a powertrain wear value, a maximum torque output, a temperature reading, a pressure amount, an air-to-fuel ratio, and an actuator position; wherein the load information includes at least one of a load weight, a load pickup reference, a load drop-off reference, and a load requirement, and wherein each of the load pickup reference and the load drop-off reference include a time and a location; wherein the load requirement includes at least one of a temperature setting, a hazardous material cost, an insurance cost, and a permitting cost; wherein the constraint includes at least one of a start time, an end time, a maximum travel duration, a maximum number of fuel stops, a minimum fuel amount, a minimum number of rest periods, a maximum number of rest periods, a minimum rest duration, and a maximum rest duration for each of the rest periods; wherein the cost strategy comprises a cost minimization strategy that includes at least one of a minimized fuel cost, a minimized total cost, an minimized emission output cost, a minimized vehicle wear cost, a minimized consumer cost, a minimized ton-mile cost, a minimized vehicle maintenance cost, and a minimized cargo cost; wherein the electronic controller further includes an output control module structured to provide a command to an output device based on the one or more route reference recommendations and wherein the output device includes at least one of a memory device, a sensory feedback device, and a vehicle speed control device; wherein the sensory feedback device includes at least one of a human machine interface, an on-board diagnostic connected device, an indicator lamp, a gauge, a printer, a speaker, and a display device; wherein the vehicle speed control device includes at least one of a brake actuator, a throttle actuator, a fuel injector, the engine, the transmission, and a final drive of the vehicle; wherein the electronic controller further includes an output control module structured to control the vehicle in accordance with at least one of the one or more route reference recommendations.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
   receiving, from a plurality of input devices in a vehicle system, route information for each of a plurality of possible routes, vehicle information of the vehicle system, and cargo load information for each of one or more cargo loads and a performance target, wherein the performance target includes at least one of a cost minimization strategy, a system wear minimization strategy, and an income maximization strategy;
   determining, with a controller, a model of the vehicle system based on at least one of a powertrain, an air handling system, a fuel management system, and an exhaust aftertreatment system, the powertrain including an engine and a transmission;
   running a simulation based on the model of the vehicle system, the route information, the vehicle information, the cargo load information, and the performance target; and
   determining one or more route reference recommendations based on a result of the simulation.

2. The method of claim 1, wherein the result of the simulation includes at least one of a torque curve, a fuel economy, an emission performance of the exhaust aftertreatment system, and a vehicle wear.

3. The method of claim 1, wherein providing the one or more route reference recommendations includes providing at least one of an estimated trip time, one of the plurality of possible routes, a number of stops, a fuel amount at any position along the one of the plurality of possible routes, a speed of the vehicle system, and a gear of the vehicle system.

4. The method of claim 1, further comprising:
   receiving, from the plurality of input devices, an environment condition,
   wherein running the simulation is further based on the environment condition, and
   wherein the environment condition includes at least one of a wind amount, a precipitation amount, a precipitation type, and a relative humidity.

5. The method of claim 4, wherein receiving the environment condition includes receiving at least one of a wind amount, a precipitation condition, an altitude, and a relative humidity.

6. The method of claim 1, further comprising:
   updating the model in real-time at any position along one of the plurality of possible routes,
   wherein running the simulation is further based on the updated model.

7. The method of claim 1, wherein the output device includes at least one of an on-board diagnostic connected device, an indicator lamp, a gauge, a printer, a memory device, a speaker, a display device, a brake actuator, a throttle actuator, a fuel injector, the engine, the transmission, and a final drive of the vehicle.

8. The method of claim 1, further comprising:
   providing the one or more route reference recommendations to an output device.

9. The method of claim 1, further comprising:
   performing at least one of the one or more route reference recommendations with the controller.

10. The method of claim 1, wherein the performance target further includes a fuel efficiency maximization strategy.

11. A method, comprising:
    with a controller in a vehicle system,
    interpreting, one or more cargo load references and one or more performance targets from a user input device, wherein the performance targets include at least one of a cost minimization strategy, a system wear minimization strategy, and an income maximization strategy;
    interpreting a plurality of available routes from a mapping input device, each of the available routes including route information;
    generating a model of a vehicle of the vehicle system, the vehicle including a powertrain, an intake system, an exhaust system, and an exhaust aftertreatment system, the powertrain including an engine and a transmission;
    simulating the model of the vehicle based on the available routes and route information, the cargo load references, and the performance targets; and
    determining a route reference recommendation based on a result of simulating the model,
    wherein generating the model of the vehicle is based on at least one of the powertrain, the intake system, the exhaust system, and the exhaust aftertreatment system.

12. The method of claim 11, wherein the cargo load references include at least one of a load weight, a load pickup time, a load pickup location, a load drop-off time, and a load drop-off location.

13. The method of claim 12, wherein the cargo load references further include at least one of a temperature setting, a hazardous material cost, an insurance cost, and a permitting cost.

14. The method of claim 11, further comprising interpreting a current operating condition of the vehicle, wherein simulating the model is further based on the current operating condition of the vehicle.

15. The method of claim 14, wherein interpreting the current operating condition of the vehicle includes interpreting at least one of a wheel speed, a fuel amount, a brake position, a torque curve, an air-to-fuel ratio, an engine condition, an environment condition, and a longitudinal velocity of the vehicle.

16. The method of claim 11, further comprising:
determining whether the vehicle is in automated mode; and
providing a vehicle speed control command based on the route reference recommendation, when the vehicle is determined to be in automated mode, to a vehicle speed control device for controlling the vehicle.

17. The method of claim 16, wherein controlling the vehicle includes controlling at least one of a brake actuator position, a throttle actuator position, a fuel injector, an engine torque, a transmission gear ratio, and a final drive selection.

18. The method of claim 11, further comprising:
displaying the route reference recommendation on a feedback device.

19. The method of claim 11, further comprising:
performing the route reference recommendation with the controller.

20. The method of claim 11, wherein the performance targets further include a fuel efficiency maximization strategy.

21. A system, comprising:
a vehicle including a powertrain and an exhaust aftertreatment system, wherein the powertrain includes an engine and a transmission; and
an electronic controller in operative communication with a plurality of inputs operable to provide signals indicating conditions of at least a portion of the vehicle, wherein the electronic controller includes:
a vehicle modeling module structured to determine a model of the vehicle;
a cost analysis module structured to determine a cost index function based on a cost strategy including at least one of minimizing a total cost, minimizing an emission output cost, minimizing a vehicle wear cost, minimizing a consumer cost, minimizing a ton-mile cost, minimizing a vehicle maintenance cost, and minimizing a cargo cost; and
a route reference determination module structured to determine a recommended route reference based on the vehicle model, the cost index function, a plurality of possible routes, and at least one of a torque curve, a fuel condition, an emission condition, a vehicle wear condition, a vehicle condition, a load condition, a route condition, an environment condition, a cost, and a constraint condition.

22. The system of claim 21, wherein the fuel condition includes a fuel amount, a fuel cost, a fuel tank capacity, a number of fueling stops, and a distance between each of the fueling stops.

23. The system of claim 21, wherein the emission condition includes at least one of an emission output, an emission performance level, and a regeneration frequency of one or more components of the aftertreatment system.

24. The system of claim 21, wherein the vehicle condition includes at least one of a rolling resistance, an air resistance, a gearing of the powertrain, a friction of the powertrain, a wear value of the powertrain, a maximum torque output, a temperature reading, a pressure amount, an air-to-fuel ratio, and an actuator position.

25. The system of claim 21, wherein the load condition includes at least one of a load weight, a load pickup time, a load pickup location, a load drop-off time, a load drop-off location, a temperature setting, a hazardous material cost, an insurance cost, and a permitting cost for a plurality of loads.

26. The system of claim 21, wherein the route condition includes at least one of a route surface grade, a route surface type, a maximum speed limit, a minimum speed limit, a maximum route trip time, a traffic condition, and an elevation.

27. The system of claim 21, wherein the environment condition includes at least one of a wind amount, a precipitation amount, a precipitation type, and a relative humidity.

28. The system of claim 21, wherein the constraint condition includes at least one of a start time, an end time, a maximum travel duration, a maximum number of fuel stops, a minimum fuel amount, a minimum number of rest periods, a maximum number of rest periods, a minimum rest duration, and a maximum rest duration for each of the rest periods.

29. The system of claim 21, wherein the cost strategy further includes minimizing a fuel cost.

30. The system of claim 21, wherein the recommended route reference is further based on at least one of one or more top speed limitations, one or more drop-off orders, one or more gear selection schemes, one or more cost incidents, and a sensitivity analysis.

31. The system of claim 21, wherein the output control module is further structured to determine at least one of a vehicle speed command to control a speed of the vehicle and a vehicle gear command to control a gear selection of the vehicle in response to the recommended route reference and a current operating condition of the vehicle.

32. The system of claim 31, wherein the current operating condition of the vehicle includes at least one of a current wheel speed, a current fuel amount, a current actuator position, a current torque output, a current air-to-fuel ratio, an engine condition, and a current longitudinal velocity of the vehicle.

33. The system of claim 32, wherein the engine condition includes at least one of an ambient air pressure, an ambient air temperature, a throttle position of the engine, and a torque output of the engine.

34. The system of claim 21, wherein the electronic controller further includes:
an output control module structured to provide a route reference to an output device based on the recommended route reference.

35. The system of claim 21, wherein the electronic controller further includes:
an output control module structured to control the vehicle in accordance with the recommended route reference.

36. A system, comprising:
a vehicle including a powertrain, an air handling system, a fuel management system, and an exhaust aftertreatment system, wherein the powertrain includes an engine and a transmission; and
an electronic controller in operative communication with a plurality of inputs operable to provide signals indicating conditions of at least a portion of the vehicle, wherein the electronic controller includes:
- a vehicle modeling module structured to determine a model of the vehicle based on at least one of the powertrain, the air handling system, the fuel management system, the exhaust aftertreatment system, and a vehicle condition;
- a cost analysis module structured to determine a cost index function based on the model of the vehicle and a cost strategy, wherein the cost strategy comprises a cost minimization strategy that includes at least one of a minimizing total cost, an minimized emission output cost, a minimized vehicle wear cost, a minimized consumer cost, a minimized ton-mile cost, a minimized vehicle maintenance cost, and a minimized cargo cost;
- a simulation module structured to run one or more simulations based on the vehicle model, the cost index function, available route information of a plurality of available routes, and at least one of a vehicle performance information, a load information, and a constraint; and
- a route reference determination module structured to determine one or more route reference recommendations based on the simulations.

37. The system of claim 36, wherein the available route information includes at least one of route surface grade, a route surface type, a traffic condition, a maximum speed limit, a minimum speed limit, and an elevation.

38. The system of claim 36, wherein the vehicle condition includes at least one of a rolling resistance, an air resistance, a powertrain gearing, a powertrain friction, a powertrain wear value, a maximum torque output, a temperature reading, a pressure amount, an air-to-fuel ratio, and an actuator position.

39. The system of claim 36, wherein the load information includes at least one of a load weight, a load pickup reference, a load drop-off reference, and a load requirement, and wherein each of the load pickup reference and the load drop-off reference include a time and a location.

40. The system of claim 39, wherein the load requirement includes at least one of a temperature setting, a hazardous material cost, an insurance cost, and a permitting cost.

41. The system of claim 36, wherein the constraint includes at least one of a start time, an end time, a maximum travel duration, a maximum number of fuel stops, a minimum fuel amount, a minimum number of rest periods, a maximum number of rest periods, a minimum rest duration, and a maximum rest duration for each of the rest periods.

42. The system of claim 36, wherein the cost minimization strategy further includes a minimized fuel.

43. The system of claim 36, wherein the electronic controller further includes an output control module structured to provide a command to an output device based on the one or more route reference recommendations and wherein the output device includes at least one of a memory device, a sensory feedback device, and a vehicle speed control device.

44. The system of claim 43, wherein the sensory feedback device includes at least one of a human machine interface, an on-board diagnostic connected device, an indicator lamp, a gauge, a printer, a speaker, and a display device.

45. The system of claim 43, wherein the vehicle speed control device includes at least one of a brake actuator, a throttle actuator, a fuel injector, the engine, the transmission, and a final drive of the vehicle.

46. The system of claim 36, wherein the electronic controller further includes an output control module structured to control the vehicle in accordance with at least one of the one or more route reference recommendations.

* * * * *